United States Patent
Lazarski et al.

(10) Patent No.: US 8,558,876 B2
(45) Date of Patent: Oct. 15, 2013

(54) METHOD AND A SYSTEM FOR GENERATING A SIGNAL FOR A VIDEO DISPLAY UNIT

(75) Inventors: Wojciech Lazarski, Zielona Gora (PL); Piotr Kobzda, Zielona Gora (PL); Tomasz Szajna, Zielona Gora (PL)

(73) Assignee: Advanced Digital Broadcast S.A., Chambesy (CH)

( * ) Notice: Subject to any disclaimer, the term of this patent is extended or adjusted under 35 U.S.C. 154(b) by 0 days.

(21) Appl. No.: 13/642,867

(22) PCT Filed: Sep. 9, 2011

(86) PCT No.: PCT/EP2011/065595
§ 371 (c)(1),
(2), (4) Date: Oct. 23, 2012

(87) PCT Pub. No.: WO2012/032136
PCT Pub. Date: Mar. 15, 2012

(65) Prior Publication Data
US 2013/0155206 A1    Jun. 20, 2013

(30) Foreign Application Priority Data
Sep. 9, 2010   (EP) ................................. 10176085

(51) Int. Cl.
*H04N 13/00*      (2006.01)
*G06F 3/14*       (2006.01)

(52) U.S. Cl.
USPC .............................. 348/51; 348/43; 345/698

(58) Field of Classification Search
None
See application file for complete search history.

(56) References Cited

U.S. PATENT DOCUMENTS

| | | | |
|---|---|---|---|
| 6,704,042 B2 * | 3/2004 | Matsui et al. | 348/43 |
| 7,724,271 B2 * | 5/2010 | Ha et al. | 345/698 |
| 2003/0128273 A1 | 7/2003 | Matsui | |
| 2006/0044391 A1 * | 3/2006 | Mauger et al. | 348/184 |
| 2006/0062490 A1 | 3/2006 | Ha | |
| 2009/0009607 A1 * | 1/2009 | Dalgaard | 348/181 |
| 2010/0123803 A1 * | 5/2010 | Ooba | 348/234 |
| 2012/0249736 A1 * | 10/2012 | Barrett et al. | 348/43 |

FOREIGN PATENT DOCUMENTS

| | | |
|---|---|---|
| JP | WO2010084791 | 7/2010 |
| WO | WO2011084169 | 7/2011 |

* cited by examiner

*Primary Examiner* — Jay Patel
*Assistant Examiner* — Reza Aghevli
(74) *Attorney, Agent, or Firm* — Mark M. Friedman

(57) ABSTRACT

A method for generating, in a video signal receiver, an output signal for a display unit, comprising the steps of determining the display mode of the display unit, detecting the type of a video input signal received by the video signal receiver, converting the received video signal into an adapted output signal compatible with the display mode of the display unit, providing the adapted output signal to the display unit.

13 Claims, 5 Drawing Sheets

METHOD AND A SYSTEM FOR GENERATING A SIGNAL FOR A VIDEO DISPLAY UNIT

TECHNICAL FIELD

The present invention relates to generating a video signal for a display unit, wherein the video signal can be a two-dimensional (2D) mono video signal or a three-dimensional (3D) stereoscopic video signal.

BACKGROUND ART

Video signals in modern television systems may comprise a mix of two-dimensional (2D) mono video signals and a three-dimensional (3D) stereoscopic video signals, for example a 3D video movie may comprise 2D commercial breaks, or a television channel may comprise a mix of 2D and 3D programming. A video signal receiver, such as a DVD player, a personal computer, a television set-top box or a game console, should process the input video signal in such a way so as to output a signal in a format acceptable by a video display unit, such as a plasma screen or a LCD screen. Typical video signal receivers provide the signal to the display unit in the original format of the signal, which requires the display unit to detect the type of the signal and display it properly. In case of older 2D display units, they will not be able to correctly display 3D signals. In case of simple 3D stereoscopic display units, they may be able to correctly display 3D signals, but may not recognize a transition to a 2D signal and in such a case the 2D signal may be displayed incorrectly. Such problems may cause frustration of the end user, for whom it may be difficult to properly set-up correct configuration of the video system components.

It is the aim of the present invention to provide a method and a system for generating a video signal for a display unit such that the video signal is adapted appropriately for the display unit regardless of the input video signal type, i.e. whether it is a 2D or a 3D video signal.

DISCLOSURE OF THE INVENTION

The object of the invention is a computer-implemented method for generating, in a video signal receiver, an output signal for a display unit, comprising the steps of determining a display mode of the display unit, detecting the type of a video input signal received by the video signal receiver, converting the received video signal into an adapted output signal compatible with the display mode of the display unit, providing the adapted output signal to the display unit.

The display mode of the display unit can further specify one of at least a mono display and a stereoscopic display.

The display mode of the display unit can further specify the expected format of frames for a stereoscopic display.

The method may comprise the step of converting a 2D video input signal into a 3D adapted output signal in case the mode of the display unit is a stereoscopic display and converting a 3D video input signal into a 2D adapted output signal in case the mode of the display unit is a mono display.

The display mode of the display unit can be determined by receiving a display mode identifier from the user.

The method may further comprise the step of providing at least one output test signal to the display unit.

The output test signal may comprise at least two image regions, wherein each image region comprises a visual indicator visible properly in a particular display mode of the display unit, wherein each visual indicator is adapted to be properly visible in a different display mode.

The visual indicator may comprise an identifier of a display mode and/or a data entry instruction.

The display mode of the display unit can be determined by receiving a display unit identifier characterizing the display unit, connecting with a database of display units, executing a query including the display unit identifier and receiving at least one display mode as a result of the query.

The method may further comprise the step of generating an OSD signal compliant with the display mode of the display unit and mixing the OSD signal with the adapted output video signal.

The type of a video input signal received by the video signal receiver can be detected upon a change of an input video signal and/or with a predetermined frequency.

A plurality of display modes of the display unit can be determined and one mode can be selected depending on the type of the video input signal, wherein the received video signal can be converted into the adapted output signal compatible with the selected display mode of the display unit.

Another object of the invention is a computer program comprising program code means for performing all the steps of the computer-implemented method when said program is run on a computer, as well as a computer readable medium storing computer-executable instructions performing all the steps of the computer-implemented method when executed on a computer.

The object of the invention is also a system for generating in a video signal receiver an output signal for a display unit, the system comprising a display unit interface configured to determine a display mode of the display unit, a signal type detector configured to detect the type of a video input signal received by the video signal receiver, a plurality of video signal converters configured to convert the received video signal into an adapted output signal compatible with the display mode of the display unit, a signal output configured to provide the adapted output signal to the display unit.

The display unit interface can be configured to determine the display mode of the display unit as one of at least a mono display and a stereoscopic display.

The display unit interface can be configured to determine the display mode of the display unit as the expected format of frames for a stereoscopic display.

The video signal converters may be configured to convert a 2D video input signal into a 3D adapted output signal in case the mode of the display unit is a stereoscopic display and to convert a 3D video input signal into a 2D adapted output signal in case the mode of the display unit is a mono display.

The display unit interface may be configured to determine the display mode of the display unit by receiving a display mode identifier from the user.

The display unit interface may be configured to provide at least one output test signal to the display unit.

The output test signal may comprise at least two image regions, wherein each image region comprises a visual indicator visible properly in a particular display mode of the display unit, wherein each visual indicator is adapted to be properly visible in a different display mode.

The visual indicator may comprise an identifier of a display mode and/or a data entry instruction.

The display unit interface can be configured to determine the display mode of the display unit by receiving a display unit identifier characterizing the display unit, connecting with a database of display units, executing a query including the display unit identifier and receiving at least one display mode as a result of the query.

The system may further comprise an OSD manager configured to generate an OSD signal compliant with the display mode of the display unit and the signal output may receive signal from an output mixer configured to mix the OSD signal with the adapted output video signal.

The signal type detector can be configured to detect the type of a video input signal received by the video signal receiver upon a change of an input video signal and/or with a predetermined frequency.

The video signal switch can be configured to determine a plurality of display modes of the display unit and select one mode depending on the type of the video input signal, wherein the received video signal can be converted into the adapted output signal compatible with the selected display mode of the display unit.

BRIEF DESCRIPTION OF DRAWINGS

The present invention will be shown by means of an exemplary embodiment on a drawing, in which.

MODES FOR CARRYING OUT THE INVENTION

Figure 1A:
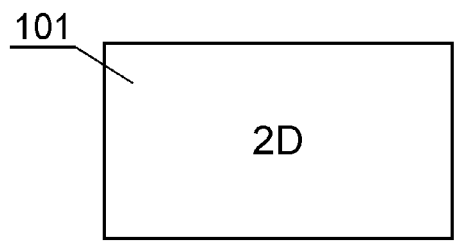
FIGS. 1A-1F show examples of typical frames of output signals for a display unit.
Figure 1B:
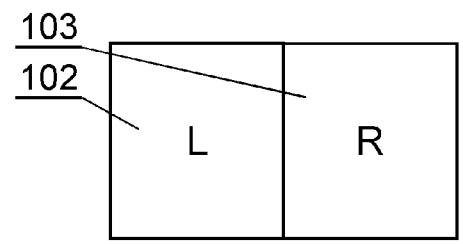
Figure 1C:
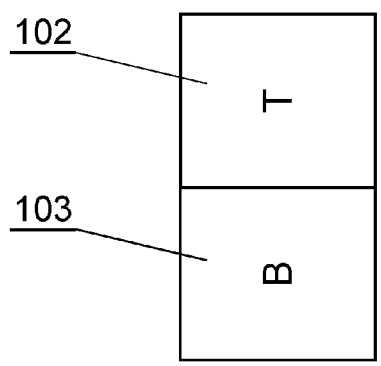
Figure 1D:
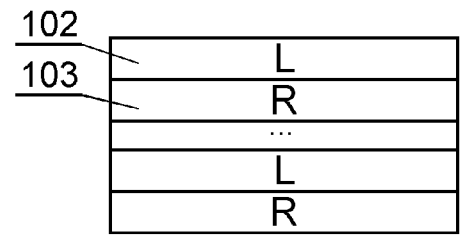
Figure 1E:
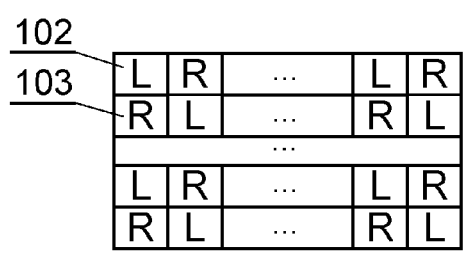
Figure 1F:
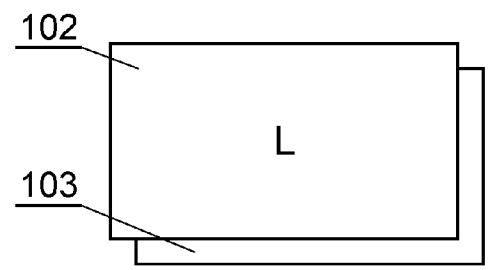

FIGS. 1A-1F show examples of typical frames of output signals for a display unit. The output signal may be a typical 2D (mono) frame as shown in FIG. 1A to be displayed on the screen directly in its entirety 101. The output signal may be also a 3D frame as shown in FIG. 1B-1E to be displayed partially on the screen. The 3D frame may comprise, as shown in FIG. 1B, a left part 102 to be displayed for the left eye of the viewer and a right part 103 to be displayed for the right eye of the viewer. The 3D frame may alternatively comprise, as shown in FIG. 1C, a top part 102 to be displayed e.g. for the left eye of the viewer and a bottom part 103 to be displayed e.g. for the right eye of the viewer. The 3D frame may alternatively comprise, as shown in FIG. 1D, interleaved lines of a frame 102 to be displayed for the left eye of the viewer and lines of a frame 103 to be displayed for the right eye of the viewer. A variant of the format shown in FIG. 1D may comprise interleaved columns of a frame 102 to be displayed for the left eye of the viewer and columns of a frame 103 to be displayed for the right eye of the viewer. Furthermore, the 3D frame may alternatively comprise, as shown in FIG. 1E, interleaved pixels or frame regions 102 to be displayed for the left eye of the viewer and pixels or frame regions 103 to be displayed for the right eye of the viewer. Furthermore, the 3D frames for the left and right eye can be output in the same manner as a 2D signal, but with a twice higher frequency, as shown in FIG. 1F. Furthermore, other types of 3D frames can be used, such as a frame comprising 2D content and depth information.

Figure 2:
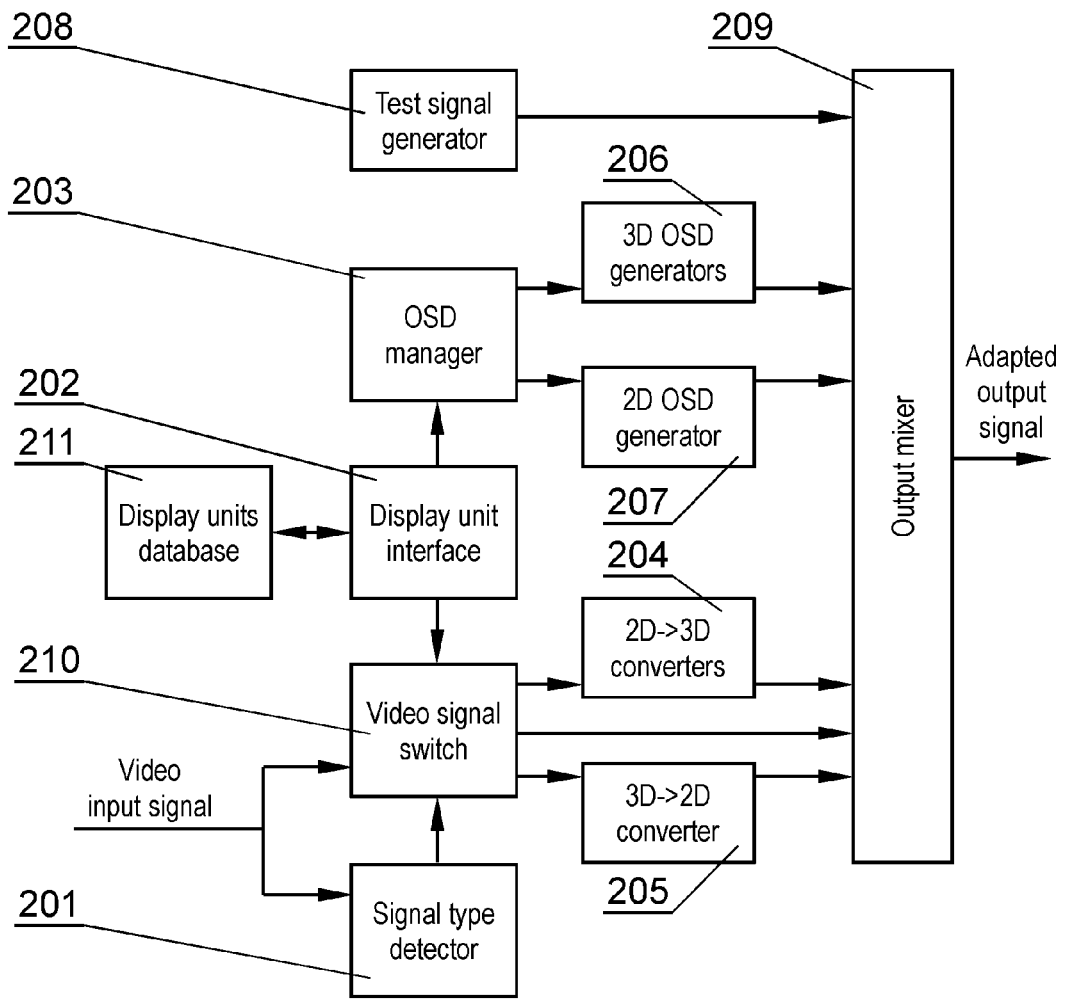
FIG. 2 shows a structure of the system for generating a signal for a video display unit according to the invention.

FIG. 2 shows a structure of the system for generating a signal for a video display unit according to the invention. The system is implementable in a video signal receiver, such as a DVD player, a personal computer, a television set-top box or a game console, which generates a signal for a video display unit, such as a plasma screen or a LCD screen. A signal type detector 201 receives a video input signal. The signal type detector 201 is configured to detect the type of the received video signal, i.e. whether it is a 2D or a 3D signal and preferably what is the particular format of the 3D signal. The signal type detector 201 may read a signal identifier contained in the header of the video input signal, read additional data such as a signal supplementary to the video input signal, or it may comprise signal processing modules configured to detect the type of video signal based on analysis of the contents of the received signal frames. A display unit interface 202 is configured to determine the display mode of the video display unit, i.e. whether the video display unit is in a 2D mode (mono display) or a 3D mode (stereoscopic display) and preferably what is the particular expected format of the 3D signal to be displayed in the 3D mode. The display unit interface 202 may be configured to read the type of the display unit via a data connection between the signal receiver and the display unit in case of display units which provide such information externally. The display unit interface 202 may be also configurable by the user, who may manually enter the mode of operation of the display unit, e.g. via a remote controller of the signal receiver. The mode of operation of the display unit may be read by the user from the display unit manual or may be determined based on a test signal displayed by the video signal receiver, as explained in details with reference to FIG. 3. Furthermore, the display unit interface 202 may be configured to receive from the user or from the display unit an identifier characterizing the display unit, such as a display unit serial number, connect with a database 211 of display units, execute a query including the received display unit identifier and receive the display mode as a result of the query. The database 211 of display units may be accessible via an external network, such as the Internet, and may be updated so as to include up-to-date information about at least the most popular display units and their modes of operation. Even if a particular display unit handles a plurality of modes of operation, the information about the particular modes handled by the display unit may be helpful to setup the system according to the invention, for example via a specific test signal. The display unit interface 202 is configured to pass the display unit mode to a video signal switch 210, which also receives the video signal type from the signal type detector 201. In case the display mode is the same as the detected type of signal, the switch 210 may pass the input video signal directly to an output mixer 209. In case the detected type of signal differs from the display mode of the display unit, the switch 210 may direct the input video signal to an appropriate converter 204, 205 configured to convert the input video signal format to an output signal adapted to the mode of operation of the display unit 201. Moreover, the video signal switch 210 can be configured to determine a plurality of display modes of the display unit and select one mode depending on the type of the video input signal, wherein the received video signal can be converted into the adapted output signal compatible with the selected display mode of the display unit. Furthermore, the mode of operation of the display unit may be communicated from the display unit interface 202 to an OSD (on-screen display) manager 203, which depending on the mode of display unit may use one of 3D OSD generators 206 or a 2D OSD generator 207 to display the OSD data in a form adapted to the display unit mode of operation. The OSD signal may comprise additional graphical data, such as subtitles, program guide information, advertising, etc. Therefore, even if the input video signal is a 2D video signal, but the display unit operates in a 3D mode, the subtitles and other OSD data for the 2D video signal can be generated in a 3D mode, which will substantially increase the viewer experience while watching a standard 2D signal. The output video signal and the OSD signal may be mixed in the output mixer 209 and may be output as an adapted output signal, adapted to the mode of operation of the display unit.

For example, if the input video signal is a 3D signal and the display unit operates in a 2D mode, the video input signal can be converted to a 2D video signal in a 3D→2D converter 205. In case the input video signal was a Left/Right 3D signal, one of the halves of the signal may be simply discarded and only the second half of the signal can be transmitted to display. Furthermore, if for example the input video signal is a 2D video signal and the display unit operates in a 3D mode, the video input signal can be converted to a 3D video signal in a particular 2D→3D converter 204. In case the display unit operates in a 3D Left/Right mode, the 2D→3D converter 204 may simply generate an output frame comprising a copy of the 2D frame at its left and right halves.

Figure 3A:
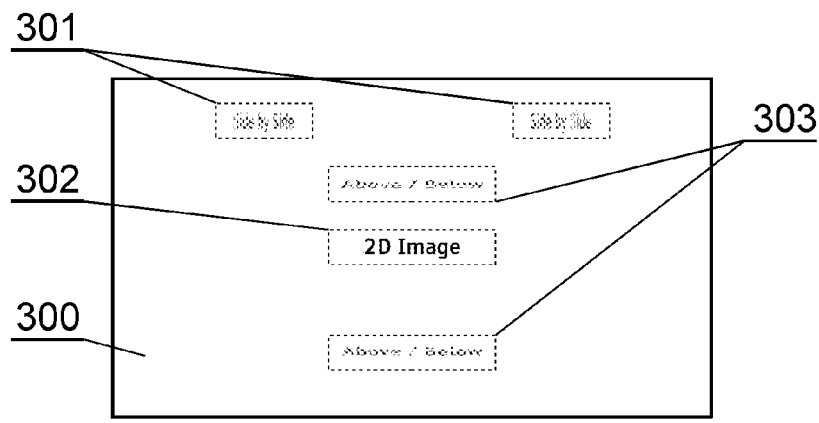
FIGS. 3A-3D show a test signal.
Figure 3B:
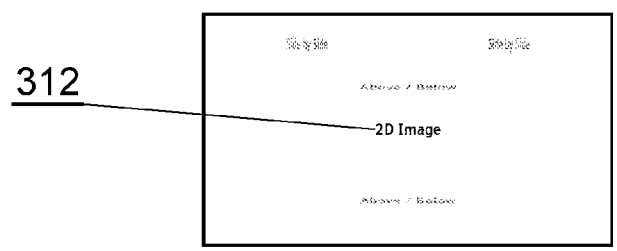
Figure 3C:
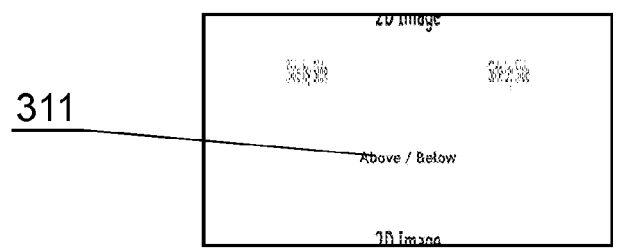
Figure 3D:
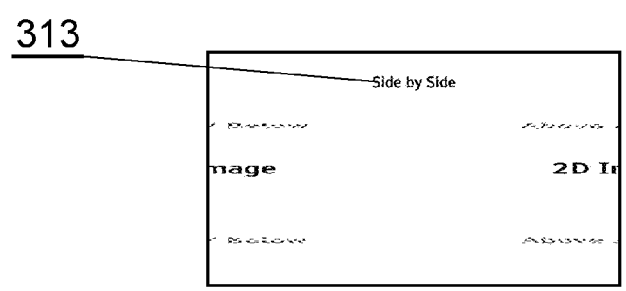

In case the user is not aware about the particular mode of the display unit and the display unit interface 202 cannot communicate with the display unit to directly determine its mode of operation, a test setup can be used to allow the user determine the mode of display unit operation. The test setup may comprise outputting a test signal from a test signal generator 208 to the display unit and receiving an input response for the user. The test signal 300 may comprise content as shown in FIG. 3A. It comprises at least two image regions 301, 302, 303, (which are not necessarily continuous regions) wherein each image region 301, 302, 303 comprises a visual indicator 311, 312, 313 visible properly in a particular display mode of the display unit as shown in FIGS. 3B-3D, wherein the visual indicator in each region is adapted to a different display mode. In the example shown in FIG. 3A, the visual indicators were prepared to allow detection of a typical 2D display mode, a Top/Bottom display more (also known as Above/Below) and a Left/Right display mode. When the test signal 300 is displayed on a display unit operating in a 2D mode, the appearance of the test signal is the same as in FIG. 3A and shown in FIG. 3B, wherein only the 2D indication 312 is properly visible to the user. When the test signal 300 is displayed on a display unit operating in a Top/Bottom 3D mode, the appearance of the test signal is as shown in FIG. 3C, wherein only the 3D indication Top/Bottom (Above/Below) 311 is properly visible to the user. When the test signal 300 is displayed on a display unit operating in a Left/Right 3D mode, the appearance of the test signal is as shown in FIG. 3D, wherein only the 3D indication Left/Right 313 is properly visible to the user. A user presented with such a test signal may easily determine the mode of operation of the display unit and provide it to the video signal receiver for correct preparation of output signal for the display unit. Although the test signal as shown in FIG. 3A has been prepared to allow detection of 2D and 3D modes as shown in FIGS. 1A-1C, it can be realized also for other types of signal, such as shown in FIG. 1D-1F. The visual indicator may specify the identifier of the mode of operation of the display unit, for example as a name of the mode. Furthermore, the visual indicator may specify a data entry instruction, such as a number, which should be entered to the signal receiver via its remote controller, the data entry instruction configured to inform the signal receiver of a particular mode.

Figure 4:
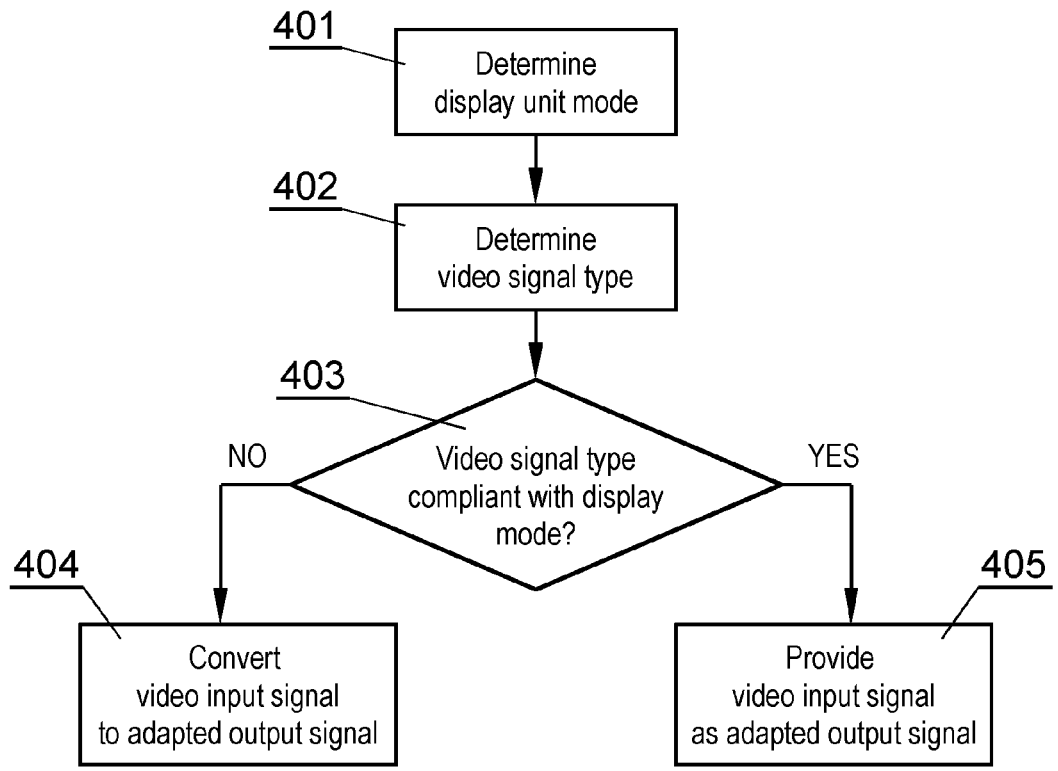
FIG. 4 shows the procedure for generating the video signal according to the invention.

FIG. 4 shows a procedure for generating the video signal according to the invention. First, in step 401, the display unit mode is determined, either by receiving a direct input from the user, or by receiving a display unit identifier from the user or by receiving a mode from the display unit itself. Next, in step 402, the video signal type is determined. The video signal type can be determined after a change of the video input signal, for example a change of a channel in a television decoder, in order to determine the type of the new signal. Alternatively, the type of the video signal can be determined periodically, for example to detect a 2D commercial break in a 3D video film. In such a case, the signal type detector 201 may analyze the video signal with a specific frequency, preferably lower than the frame display rate, such as 2 frames per second, in order to minimize the computational load of the signal receiver. Next, in step 403 it is checked whether the input video signal is compliant with the display mode of the display unit. If so, the video input signal is provided directly to the display unit as an already adapted output signal. If not, the video input signal is converted to adapted output signal in an appropriate converter 204, 205 having an input compatible with the input video signal, i.e. able to properly read the input video signal, and an output compatible with the display unit display mode, i.e. such that the output can be properly displayed by the display unit.

Figure 5:
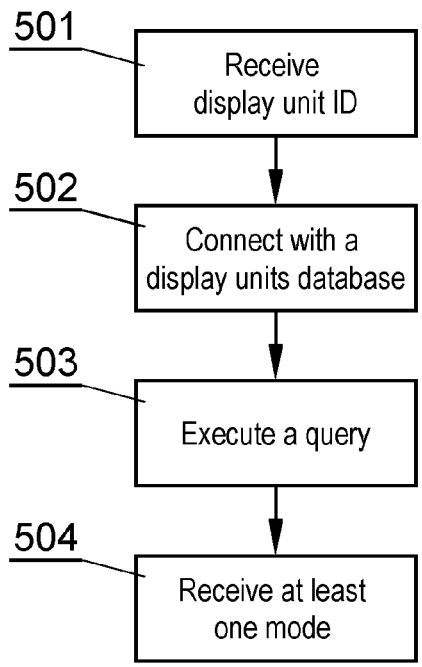
FIG. 5 shows the procedure for determining a display mode using a display unit identifier.

FIG. 5 shows a procedure for determining a display mode using a display unit identifier. The procedure may receive in step 501 a display unit identifier, such as a serial number or a model number, form the user or from the display unit, via a data communication interface between the signal receiver and the display unit, such as e.g. HDMI or DVI. Next, in step 502 a connection with a display units database 211 is made, such as an external database accessible via Internet and in step 503 execute a query including the display unit identifier. The database may be configured to return in response to the query one or more modes of operation with which a given display unit may operate, which are received in step 504.

In case a plurality of modes of the display unit are determined in step 504 or in other way, for example entered manually by the user or read from the display unit via a data interface, one mode can be selected as best suited for display of the particular type of the video input signal. Then, the received video signal is converted into the adapted output signal compatible with the selected display mode of the display unit. For example, if an input signal is a 2D video signal and the display unit supports a horizontal interlaced 3D mode and a Left/Right 3D mode, a horizontal interlaced 3D mode can be selected as it provides a better resolution and less data loss. The selection criteria, apart from the type of video input signal, may comprise other elements, such as a signal quality, resolution, etc.

Figure 6:
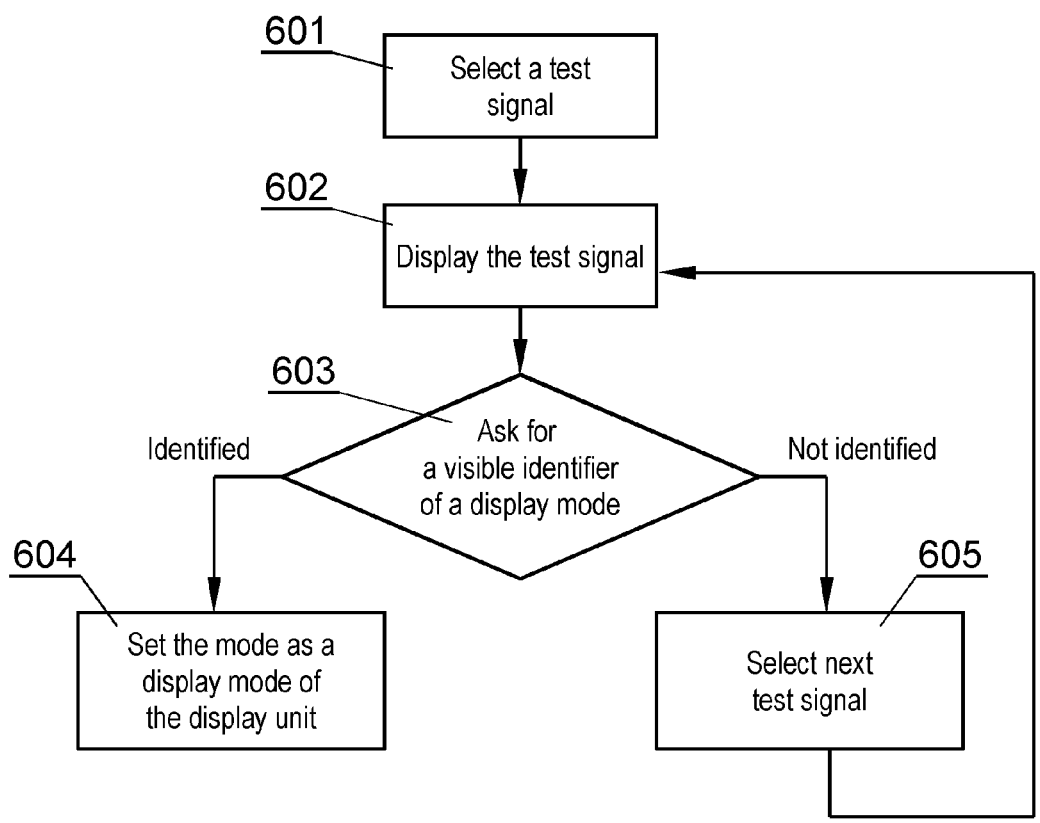
FIG. 6 shows the procedure for receiving a display mode directly from the user on the basis of a test signal.

FIG. 6 shows a procedure for receiving a display mode directly from the user on the basis of a test signal. In step 601 a test signal is selected. The test signal may be a default signal for testing basic display modes, as shown in FIG. 3A. Alternatively, the test signal may be selected depending on the display modes handled by a particular display unit, which could be determined using the procedure of FIG. 5. Next, in step 602 the test signal is output to the display unit and a user is asked for identification of a visible mode identifier in step 603. In case a user identifies a display mode, the identified mode is set as the display mode of the display unit in step 604. In case the user did not identify any display mode (for example, a period of time expired after presentation of the test signal and no input was received from the user), a next test signal may be selected in step 605, for example a test signal adapted to a different set of display modes and the procedure returns to step 602.

It can be easily recognized, by one skilled in the art, that the aforementioned system and method for generating a video signal for a display unit may be performed and/or controlled by one or more computer programs. Such computer programs are typically executed by utilizing the computing resources of a processing unit which can be embedded within various video signal receivers, such as personal computers, personal digital assistants, cellular telephones, receivers and decoders of digital television, video display units or the like. The computer programs can be stored in a non-volatile memory, for example a flash memory or in a volatile memory, for example RAM and are executed by the processing unit. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein. Accordingly, the scope of protection is not limited to the preferred embodiments described in the specification, but is only limited by the claims that follow.

The invention claimed is:

1. A computer-implemented method for generating, in a video signal receiver, an output signal for a display unit, it comprises the steps of: determining whether a display mode of the display unit is a mono display mode or a stereoscopic display mode, detecting whether the type of a video input signal received by the video signal receiver is a mono signal or a stereoscopic signal, converting the received video signal into an adapted output signal compatible with the display mode of the display unit, providing the adapted output signal to the display unit, characterized in that the display mode of the display unit is determined by providing an output test signal to the display unit, the test signal comprising at least two image regions (301-303), wherein a first image region (302) having a predetermined intended proper visibility (312) only in a mono display mode and a second image region (301, 303) comprises a visual indicator having a predetermined intended proper visibility (311, 313) only in a stereoscopic display mode; receiving a display mode identifier from the user.

2. The method according to claim 1, wherein the display mode of the display unit further specifies the expected format of frames for a stereoscopic display.

3. The method according to claim 1, wherein the visual indicator comprises an identifier of a display mode and/or a data entry instruction.

4. The method according to claim 1, further comprising the step of generating an OSD signal compliant with the display mode of the display unit and mixing the OSD signal with the adapted output video signal.

5. The method according to claim 1, wherein the type of a video input signal received by the video signal receiver is detected upon a change of an input video signal and/or with a predetermined frequency.

6. The method according to claim 1, wherein a plurality of display modes of the display unit are determined and one mode is selected depending on the type of the video input signal, wherein the received video signal is converted into the adapted output signal compatible with the selected display mode of the display unit.

7. A system for generating in a video signal receiver an output signal for a display unit, characterized in that it comprises: a display unit interface (202) configured to determine whether the display mode of the display unit is a mono display mode or a stereoscopic display mode, a signal type detector (201) configured to detect whether the type of a video input signal received by the video signal receiver is a mono signal or a stereoscopic signal, a plurality of video signal converters (204, 205) configured to convert the received video signal into an adapted output signal compatible with the display mode of the display unit, a signal output (209) configured to provide the adapted output signal to the display unit, characterized in that it further comprises a test signal generator (208) configured to provide an output test signal to the display unit, the test signal comprising at least two image regions (301-303), wherein a first image region (302) having a predetermined intended proper visibility (312) only in a mono display mode and a second image region (301, 303) comprises a visual indicator having a predetermined intended proper (311, 313) visibility only in a stereoscopic display mode; wherein the signal type detector (201) is configured to receive a display mode identifier from the user in response to the displayed test signal.

8. The system according to claim 7, characterized in that the display unit interface (202) is further configured to determine the display mode of the display unit as the expected format of frames for a stereoscopic display.

9. The system according to claim 7, wherein the visual indicator comprises an identifier of a display mode and/or a data entry instruction.

10. The system according to claim 7, further comprising an OSD manager (203) configured to generate an OSD signal compliant with the display mode of the display unit and wherein the signal output (209) comprises a mixer configured to mix the OSD signal with the adapted output video signal.

11. The system according to claim 7, wherein the signal type detector (201) is configured to detect the type of a video input signal received by the video signal receiver upon a change of an input video signal and/or with a predetermined frequency.

12. The system according to claim 7, wherein the video signal switch (210) is configured to determine a plurality of display modes of the display unit and to select one mode depending on the type of the video input signal, wherein the received video signal is converted into the adapted output signal compatible with the selected display mode of the display unit.

13. A computer readable non-volatile memory storing computer-executable instructions for performing all the steps of the computer-implemented method according to claim 1 when executed on a computer.

* * * * *